3,229,711
METHOD AND APPARATUS FOR CONNECTING A SERVICE LINE TO A MAIN WITHOUT ESCAPE OF FLUID FROM THE MAIN TO THE ATMOSPHERE
Wilbur R. Leopold, Jr., John J. Smith, and Lawrence F. Luckenbill, Decatur, Ill., assignors to Mueller Co., Decatur, Ill., a corporation of Illinois
Filed Oct. 30, 1963, Ser. No. 320,161
21 Claims. (Cl. 137—318)

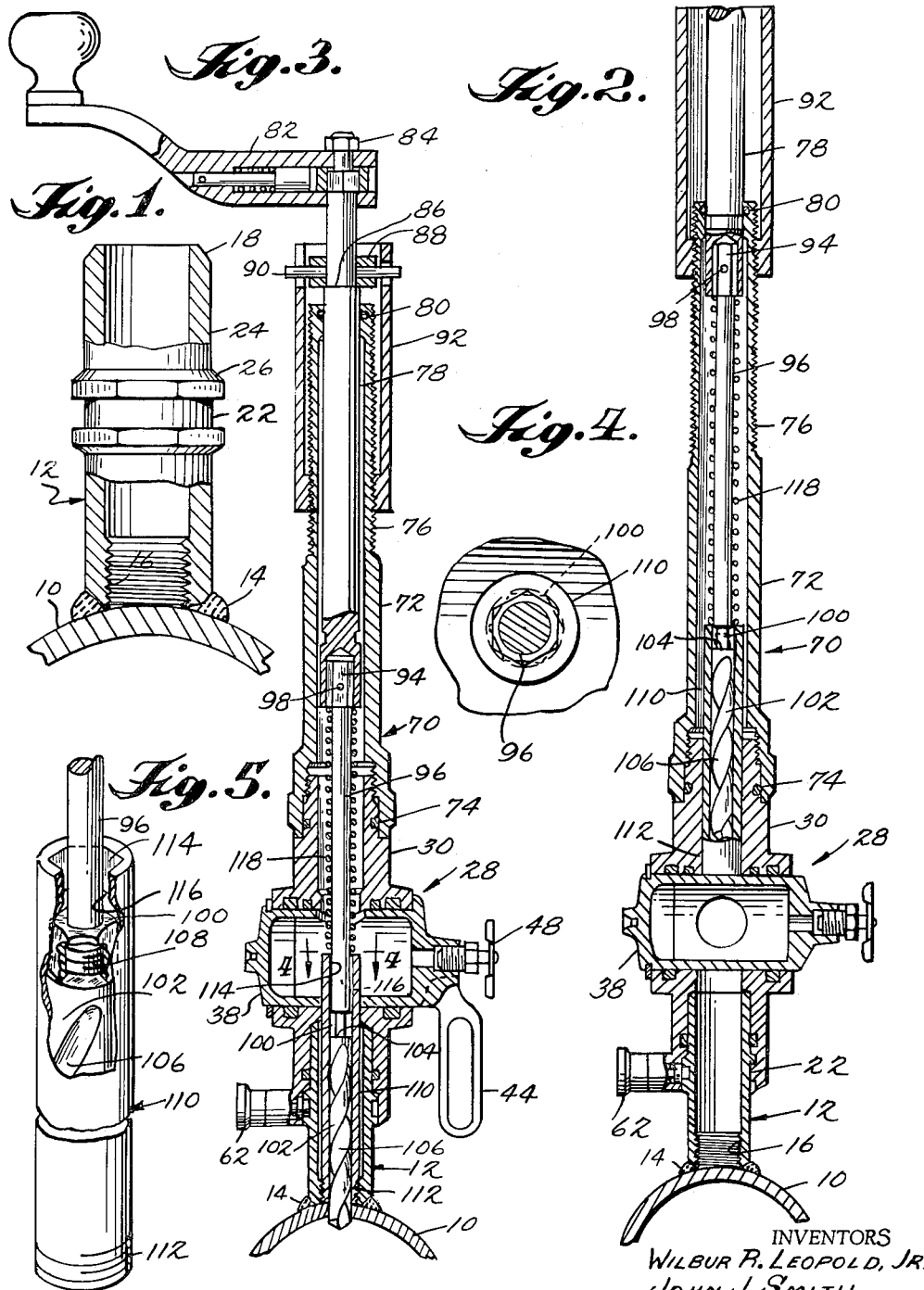

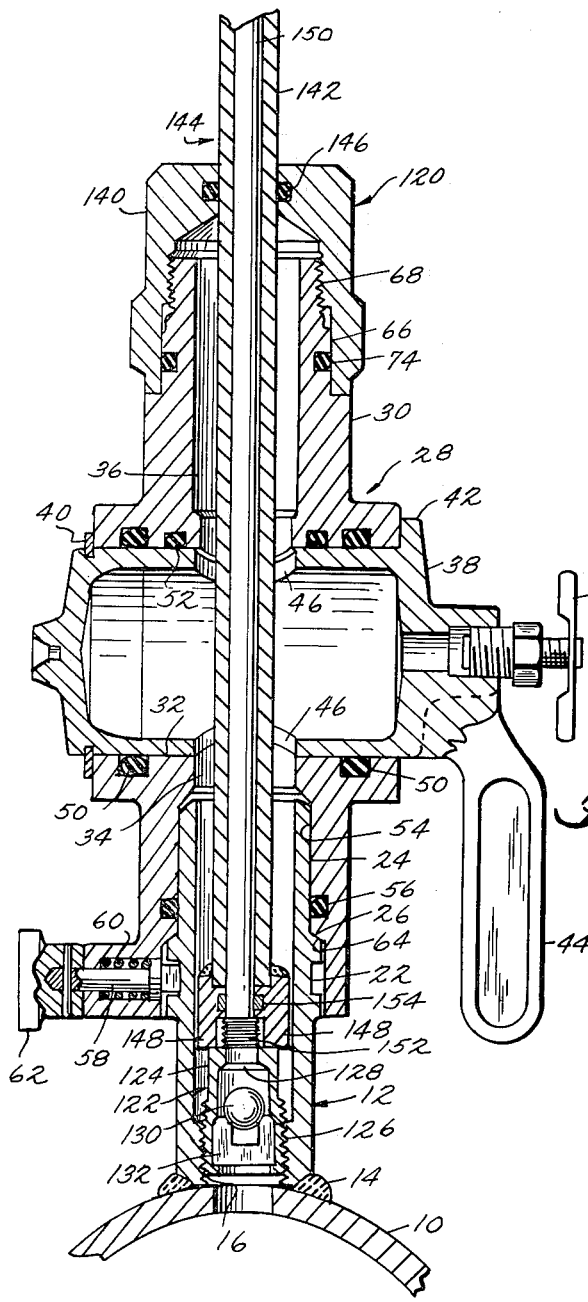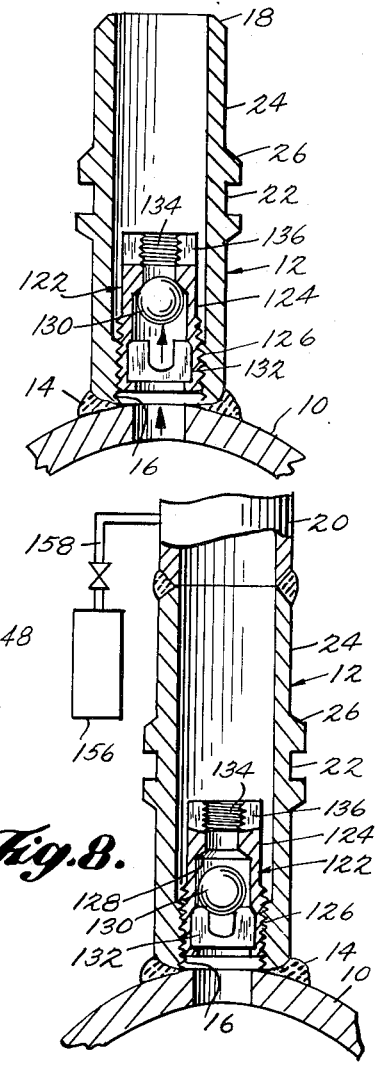

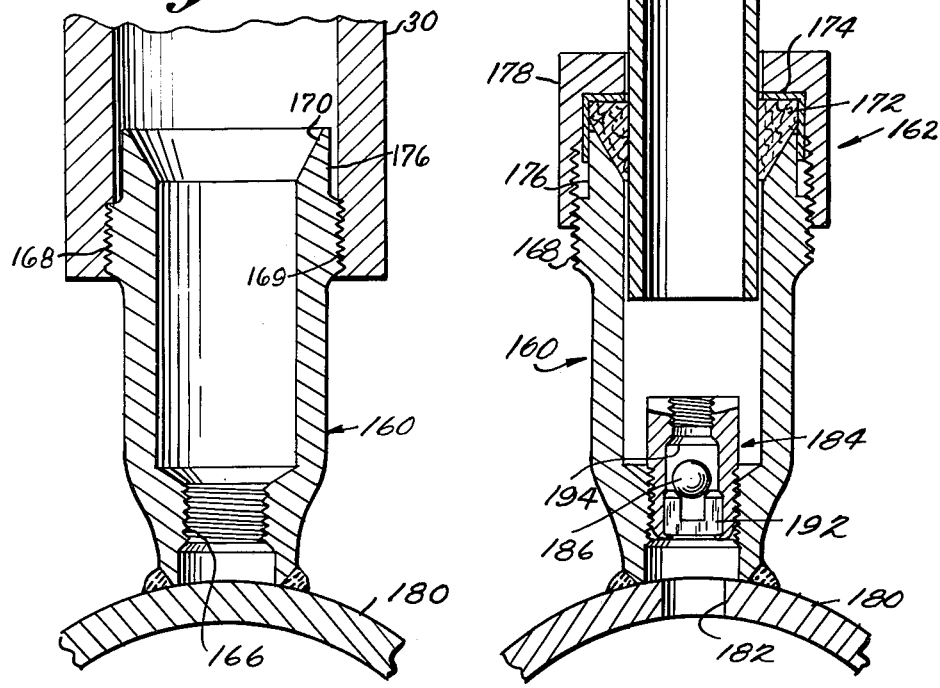

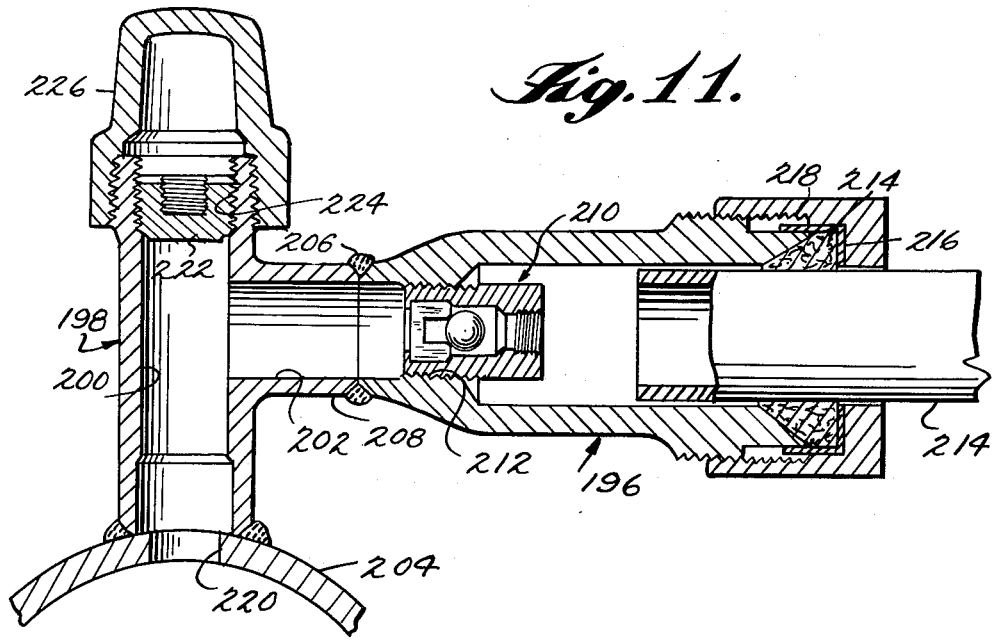
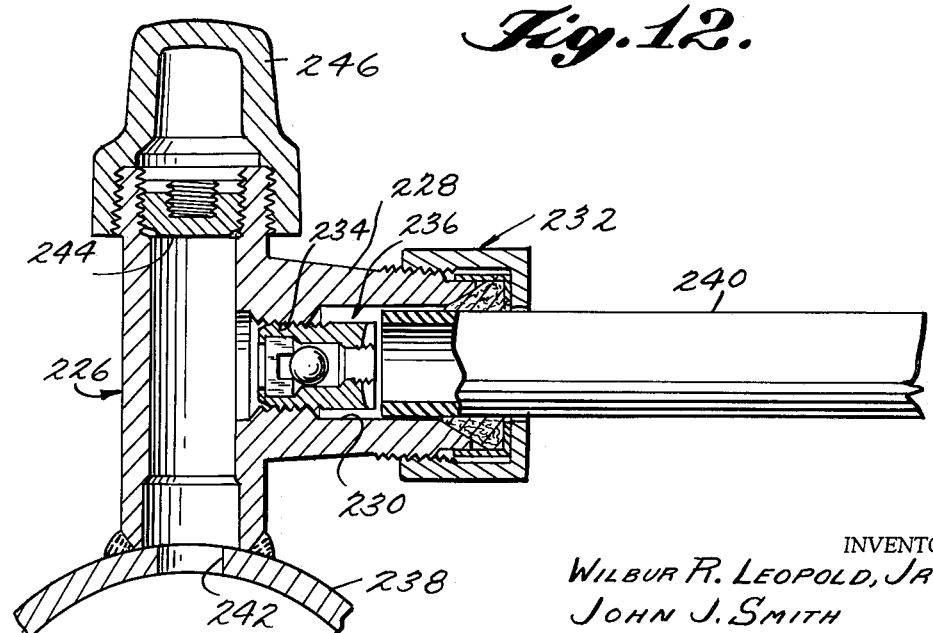

This invention relates to improvements in methods and appartus for connecting a service line to a street main without escape of fluid from the main to the atmosphere. More particularly, this invention relates to improved fittings, and methods of using the same, for connecting a service line to a main. This application is continuation-in-part of our copending application Serial No. 225,194, filed September 21, 1962, now abandoned.

Fittings for connecting a service line to a main without escape of fluid from the main to the atmosphere are known in the art. In the past, however, all such fittings have been in the form of a service T having a through bore and a lateral outlet, with one end of the T, i.e., the inlet end of the bore, being adapted to be secured radially to a main and with the outlet being adapted to have a service line connected thereto. After the T is secured to a main and a service line is connected to the lateral outlet, one end of a valve, through which various operations can be conducted as is well known in the art, is connected to the other or open end of the T bore. A fluid-tight drilling machine, of a character well known in the art, then is connected to the other end of the valve and operated downwardly through the valve and T bore to drill a hole in the wall of the main and establish service. Thereafter, the drilling machine is removed and replaced by apparatus well known in the art by means of which an exteriorly threaded plug is inserted through the valve and screwed into the open or other end of the T bore to prevent the escape of fluid to the atmosphere. Thereafter, the valve is removed and the outer end of the T may be provided with a conventional closure cap to form an additional seal.

While T's of this type, and known methods of using the same to connect a service line to a main, have been satisfactory, improvements can be made. For example, a service T is relatively expensive as compared to a simple nipple.

Accordingly, it is an object of this invention to provide an improved method and apparatus for connecting a service line to a main without escape of fluid from the main to the atmosphere.

It is another object of this invention to provide an improved and less expensive fitting for connecting a service line to a main.

It is a further object of this invention to provide a service nipple which embodies an excessive flow safety valve that serves not only to permit the nipple to be used to connect a service line to a main without escape of fluid to the atmosphere, but also thereafter to sut off service in the event of excessive flow caused by a fracture, a break or the like, in the service line beyond the valve.

Various types of connections have been used in the past to connect service lines to service fittings, both T's and nipples. Such connections include threaded types, welded types and friction-grip types. Friction-grip types have the advantage of yielding, without damage to the several parts of the connection or to the service line, when the latter, which normally is buried in the ground, is placed under tension, as during excavating operations when the line is accidentally encountered by a powered excavating machine. On the other hand, when a service line is connected to a service fitting by threads or a weld and is so accidentally encountered, the line or fitting may break or the connection itself may fracture. In the event of a friction-grip type of connection, however, the service line simply will pull out of the connection without damage. Additionally, the end of the service line may be replaced in the connection, and the latter re-tightened, to again place the line in service without the necessity of replacement or repair of any parts.

Of course, if a service line is accidentally pulled out of a friction-grip type of connection with a service fitting, and the main to which the fitting is connected is under pressure, fluid will escape to the atmosphere. If the main contains gas, a dangerous situation will be created.

Accordingly, it is a further object of this invention to provide an improved service fitting which embodies not only a friction-grip type of connection for a service line, but also an excessive flow safety valve which will shut off service in the event of excessive flow from the fitting caused by a fracture, a break, or the like, in the service line beyond the fitting, or by the service line being pulled out of the fitting as aforedescribed.

As aforedescribed, it is known in the art to conduct drilling operations through a service T in the process of connecting a service line to a main. In the past, such drilling operations have given rise to difficulties because of the resulting chips which fall into the main and may become lodged in and impair the operation of various downstream devices, e.g., valves or pressure regulators, or else may be carried upwardly into the service line with similar attendant difficulties. Devices for collecting chips resulting from such drilling operations are known, but, again, are susceptible of improvement.

Accordingly, it is an object of this invention to provide an improved assembly of a drill and chip-collector which facilitates the drilling of a main in the operation of connecting a service line thereto.

Other objects and advantages of the invention will become apparent from the following description and accompanying drawings in which:

FIGURE 1 is a fragmentary vertical sectional view showing a nipple secured to the wall of a main in accordance with this invention;

FIGURE 2 is a view corresponding to FIGURE 1 but illustrating the connection to the nipple of an improved fluid-tight drilling apparatus embodying this invention;

FIGURE 3 is a view corresponding to FIGURE 2 but illustrating the operation of the drilling apparatus to drill a hole through the wall of the main;

FIGURE 4 is an enlarged fragmentary sectional view taken substantially on line 4—4 of FIGURE 3;

FIGURE 5 is an enlarged fragmentary perspective view, with parts cut away to illustrate details, of a drill and chip-collector assembly embodying this invention;

FIGURE 6 is a view corresponding to FIGURE 2 but illustrating the operation of inserting and fastening an excessive flow safety valve within the nipple;

FIGURE 7 is a view corresponding to FIGURE 6 but illustrating the condition of the valve after the inserting apparatus has been removed from the nipple;

FIGURE 8 is a view corresponding to FIGURE 7 but showing a service line connected to the outer end of the nipple and the establishment of service.

FIGURE 9 is an enlarged fragmentary view corresponding in part to FIGURE 2 but showing a modified form of service nipple and drilling valve.

FIGURE 10 is a view corresponding to FIGURE 8 but illustrating the modified service nipple shown in FIGURE 1.

FIGURE 11 is a fragmentary vertical sectional view illustrating the connection of a service line to a main with a conventional service T, but also utilizing the service nipple shown in FIGURE 9 as a supplemental fitting to provide many of the same advantages for the connection as are had by the embodiment of the invention shown in FIGURE 10, and FIGURE 12 is a view corresponding to FIGURE 11 but showing the use of an improved and modified form of service T to provide for the service connection many of the advantages of this invention which are embodied in the service connection shown in FIGURE 10.

Referring now to the drawings, there is shown in FIGURE 1 a portion of the wall of a street main 10, for example, a gas main carrying gas under pressure. In order to connect a service line, leading to a dwelling or the like, to the main 10 in accordance with this invention, one end of a nipple 12 is secured radially and exteriorly to the wall of the main. Such connection preferably will be made by welding, as shown at 14 in the drawing, but can be made by other methods known in the art, for example, by the use of a service clamp (not shown). The nipple 12 is provided with interior threads 16, preferably adjacent its inner end. The outer end of the nipple is provided with a configuration especially adapted to have a service line connected thereto. For example, the outer end of the nipple may be chamfered, as at 18, to facilitate butt welding thereto the correspondingly chamfered end of a service line 20, as shown in FIGURE 8. Inwardly of its outer end, the nipple 12 is provided with an exterior circumferential groove 22 and that section 24 of the exterior surface of the nipple between its outer end and the groove, preferably is smooth and cylindrical for reasons later explained. Desirably, forwardly or inwardly of the smooth wall section 24, the nipple 12 is enlarged to provide a rearwardly or outwardly facing shoulder 26, and the outer circumferential groove 22 may be formed in such enlarged portion of the nipple so as to preserve the wall strength thereof. Additionally, the exterior surface of the enlarged portion is non-circular, e.g., hexagonal as shown, for reasons later explained.

Referring now to FIGURES 2 and 3 of the drawings, after the nipple 12 has been welded to the main 10, as shown in FIGURE 1, there is connected to the outer end thereof a valve 28 through which drilling and other operations can be conducted as later explained. Although various types of valves are suitable for this purpose, the valve shown is of the type disclosed more in detail in U.S. Patent 2,547,831 and also in the copending U.S. application of Floren et al. Serial No. 12,645, now Patent 3,066,908. Rather briefly, the valve 28, shown best in FIGURE 6, is of the cylindrical rotary plug type having a body 30 provided with a cylindrical seat 32 intercepting diametrically disposed inlet and outlet passageways 34 and 36. A cylindrical valve plug 38 is rotatably received in the seat 32 and retained therein by a snap ring 40 engaged in an exterior circumferential groove in the plug and bearing against the valve body 30 at one end of the seat. The other end of the plug 38 is provided with a combined retaining and rotational limiting lug 42 which projects radially of the plug and overlaps and bears against the valve body 30 at the other end of the seat 32. Abutment members (not shown) project longitudinally from the valve body 30 in circumferentially spaced relation on opposite sides of the lug 42 for alternative engagement by the latter to limit rotation of the plug 38 to 90° in turning between valve open and valve closed positions. The plug is provided with a conventional operating handle 44 and preferably has a hollow interior provided with diametrically disposed ports 46 alignable with the inlet 34 and outlet 36 in the open position of the valve 28. The plug 38 desirably is provided with a conventional bleed valve 48 for ascertaining whether pressure exists in the interior of the plug. Preferably, the plug 38 is sealed to its seat 32 by O-rings 50 disposed in circumferential grooves in the seat, adjacent the opposite ends of the latter. Additionally, an O-ring 52 preferably is disposed in circumferential groove in the seat 32 surrounding the outlet 36 and sealingly engaged with the opposed surface of the plug 38.

The inlet 34 of the valve body 30 is provided with an inner cylindrical section 54 adapted to snugly receive the outer smooth cylindrical section 24 of the nipple 12. A seal between the valve body 30 and the nipple 12 desirably is provided by an O-ring 56 disposed in a circumferential groove in the inlet section 54 and sealingly engaged with the opposed smooth surface of the nipple. The valve 28 is retained in assembled position with the nipple 12 by means of a locking pin 58 extending through a radial bore in a radially enlarged portion of the valve body 30 and into the groove 22 in the nipple. The pin 58 is constantly urged radially inwardly by a coil compression spring 60 interposed between an outwardly facing shoulder on the pin and an inwardly facing shoulder in the bore in the valve body 30. The outer end of the pin 58 has a retracting knob 62 affixed thereto. The outer end of the inlet 34 is of enlarged non-circular configuration complimentary to the enlarged portion of the nipple 12 to thus restrain rotation of the valve 28 relative to the nipple. This enlarged portion of the inlet 34 provides an outwardly facing shoulder 64 engageable with the shoulder 26 on the nipple 12 to properly align the pin 58 with the groove 22. The boss containing the outlet 36 of the valve body 30 is provided with a section 66 having a smooth outer cylindrical surface merging, at its outer end, in exterior threads 68 of reduced diameter.

Connected to the valve 28 is drilling apparatus 70 having an elongated cylindrical body 72 provided at its lower end with interior threads engageable with the threads 68 on the valve body 30. A seal between the body 72 and the valve 28 preferably is effected by an O-ring 74 disposed in a circumferential groove in the section 66 of the valve body 30 and engaged with an opposed smooth interior surface of a shirt-like portion of the body 72 extending below the interior threads therein. The upper or outer end of the body 72 is provided with extended exterior threads 76 and with a guide bore for a boring bar 78. A seal between the body 72 and the bar 78 preferably is effected by an O-ring 80 disposed in a circumferential groove in the body bore and sealingly engaged with the bar. In order to rotate the bar 78, the outer end thereof is provided with a conventional ratchet handle 82 detachably secured to the bar by a nut 84 threaded onto its outer end. Adjacent the handle 82 the bar 78 is provided with an outwardly or rearwardly facing shoulder 86 against which is seated a thrust collar 88 having a pair of diametrically disposed pins 90 projecting radially therefrom for detachable engagement, by a bayonet joint, with the outer end of a feed sleeve 92, preferably exteriorly knurled and having interior threads at its lower end engaged with the threads 76 on the body 72. By reason of the foregoing construction, it will be seen that rotation of the sleeve 92, with the pins 90 engaged therewith, will serve to feed the boring bar 78 forwardly, while the latter can be rotated independently of the feed by the ratchet handle 82.

The lower or inner end of the bar 78 is provided with a noncircular, e.g., hexagonal, socket for reception of a complementary head 94 on the end of a drill shank 96. The head 94 may be detachably retained in the socket by a transverse locking pin 98. The drill shank 96 is cylindrical for the major portion of its length and terminates, at its inner end, in a somewhat enlarged non-circular section 100, e.g., hexagonal in cross-section, as shown in FIGURES 3, 4 and 5. Inwardly beyond the section 100 is a conventional circular or cylindrical twist drill 102, of a major diameter greater than that of the minor transverse dimensions of the section 100 to provide upwardly or rearwardly facing shoulder portions 104. The drill 102 is provided with conventional spiral chip-collecting flutes 106. While it will be realized that the shank 96 and drill 102 may be made in one piece, they are illustrated in the drawings as being formed in two pieces, with a threaded connection therebetween, i.e., the rearward end of the drill terminating in a reduced exteriorly threaded stem 108 receivable in a correspondingly interiorly threaded socket in the lower end of the noncircular section 100, so that the shank constitutes a drill holder.

Snugly enclosing and of a length greater than the drill 102 is a sleeve-like chip-collector 110 having exterior threads 112 on its lower or inner end adapted to engage with the threads 16 in the nipple 12. At its upper end, the interior of the chip-collector 110 is reduced and provided with an interior non-circular configuration 114 complementary to that of the section 100 on the drill shank 96 and with downwardly or forwardly facing shoulder portions 116. When the noncircular sections 100 and 114 are engaged, as shown in FIGURE 2, the chip-collector 110 extends beyond the tip of the drill 102, and the drill and the chip-collector may be rotated as a unit by the boring bar 78. In this engaged position of the section 100 and 114, it will be seen that the chip-collector 110 is prevented from advancing further relative to the drill 102 by means of the interengagement of the shoulders 104 and 116. In order to normally retain the sections 100 and 114 of the drill shank 96 and chip-collector 110 in engagement, a coil compression spring 118 surrounds the drill shank 96 and engages against the end of the boring bar 78 and the upper or outer end of the chip-collector.

In order to operate the foregoing apparatus to drill a hole in the main 10, the valve 28 is opened and the boring bar 78 advanced until the threads 112 on the chip-collector 110 engage with the threads 16 in the nipple 12. Whereupon the bar 78 is rotated to thus rotate the chip-collector 110 and screw the same into the nipple threads 16. Thereafter, the boring bar 78 is pushed downwardly sufficiently to disengage the noncircular sections 100 and 114 on the drill shank 96 and on the chip-collector 110, as shown in FIGURE 5 so that the drill 102 can be rotated independently by the bar, and advanced by the feed sleeve 92, to drill a hole in the main 10, as shown in FIGURE 3. During this operation any reaction torque on the body 72 and on the valve 28 is counteracted by the aforedescribed non-rotative engagement between the valve and the nipple 12.

After a hole has been drilled in the main 10, as aforedescribed, the boring bar 78 is retracted and manipulated until the interlocking sections 100 and 114 on the drill shank 96 and chip-collector 110 re-engage so that reverse rotation of the bar will unscrew the chip-collector from the nipple 12 and permit the chip-collector and the drill to be retracted sufficiently so that the valve 28 can be closed, as shown in FIGURE 2. Thereupon, the drilling apparatus 70 is unscrewed and removed from the valve 28. It will be seen that most, if not all, of the chips caused by the drilling operation will pass up or rearwardly into the flutes 106 in the drill 112 and be retained therein because of the snug fit of the chip-collector 110. Hence, removal of the drill 112 and chip-collector 110 as a unit prevents any chips from falling into the main 10. The flutes 106 in the drill 112 are long enough to receive substantially all the chips made in a drill operation on the thickest wall pipe anticipated to be drilled. It also will be noted that the drill shank 96 is long enough to enable the chip-collector 110 to be pushed rearwardly sufficiently to uncover the full length of the drill flutes 106 for cleaning chips therefrom.

Thereafter, by means of inserting apparatus 120, described more in detail hereinafter, an excessive flow safety valve 122 (FIGURES 6, 7 and 8) is inserted and fastened within the nipple 12. This valve 122 preferably is of the type shown in the U.S. patent to Jerman 2,569,316, and includes a sleeve-like body member 124 provided with exterior threads 126 adapted to engage the nipple threads 16. Adjacent its outer end the body member 124 is interiorly reduced to form an inwardly facing valve seat 128 against which a ball valve 130 is adapted to seat. The ball valve 130 is of a diameter only slightly less than the interior diameter of the body member 124 inwardly of the valve seat 128 so as to provide a restriction to flow of fluid past the ball valve through the sleeve member 124, as later explained. Secured within the inner end of the body member 124 is a generally U-shaped permanent magnet 132 having the legs thereof extending toward the valve seat 128 so as to normally attract and hold the ball valve 130 out of engagement with the seat 128. The magnet 132 is generally flat in transverse section so as to provide for a flow of fluid on opposite sides thereof through the body member 124.

The attractive force of the magnet 132, the weight of the ball valve 130, and the size of the flow restriction between the ball and the interior of the body member 124 are so proportioned that the magnet normally retains the ball valve unseated when flow of fluid through the body member does not exceed a predetermined rate, normally slightly in excess of the maximum flow demand of the service line 20. On the other hand, if the flow exceeds the predetermined rate and thus causes a pressure drop across the ball 130 with a resulting seating force thereon greater than the attractive force of the magnet 132 plus the weight of the ball 130, the latter will be forced off of the magnet onto the valve seat 128 and thus shut off flow of fluid through the body member 124. The ball valve 130 will remain seated until the seating pressure differential thereacross is reduced sufficiently to allow the magnet 132 plus the weight of the ball valve to unseat the latter. The outer end of the body member 124 is provided with interior threads 134 and with a transverse kerf 136 for reasons explained in detail hereinafter.

The excessive-flow safety valve 122 is inserted and fastened within the nipple 12 by inserting apparatus 120 of a type known in the art. This apparatus, shown in FIGURE 6, includes a cap-like body 140 having interior threads engageable with the threads 68 on the valve body 30 and with a skirt portion which seals with the O-ring 74 in the same manner as the body 72 of the drilling apparatus 70. Similarly, the body 140 is provided at its outer end with a guiding bore for the tube 142 of an inserting tool 144. A seal is effected between the body 140 and the tube 142 by means of an O-ring 146 disposed in a circumferential groove in the bore and sealing with the tube. At its lower end, the tube 142 terminates in two forwardly projecting tangs 148 adapted to engage in the transverse kerf 136 in the excessive-flow safety valve 122. Rotatably extending through the tube 142 is a retaining rod 150 having exterior threads 152 on its forward end engageable with the threads 134 of the excessive-flow safety valve 122 in order to retain the latter on the inner end of the tool 144. Preferably, a seal is effected between the tube 142 and the rod 150 as by means of an interior circumferential groove in the tube adjacent its inner or lower end in which is disposed an O-ring 154 which sealingly engages with the rod.

In order to insert and secure the excessive-flow safety valve 122 in position, after the drilling apparatus 70 has been removed from the valve 28, the body 140 of the inserting apparatus 120 is connected to the valve 28, and the latter is opened to permit the tool 144, with the valve 122 attached thereto, to be advanced through the valve 28 and into the nipple 12 for engagement with the threads 16 therein. Thereupon, the tube 142 is rotated to screw the valve 122 into the nipple 12, as shown in FIGURE 6. After the valve 122 is screwed tightly in place, the rod 150 is reversely rotated to disengage the tool 144 from the excessive-flow safety valve. At this time the inserting apparatus is removed from the valve 28, thus exposing the outer end of the valve 122 to atmosphere to allow gas to flow from the main 10 through the excessive-flow safety valve 122. Since such flow will be substantially unimpeded and, thus, excessive, it will immediately act to force the ball valve 130 off the magnet 132 and onto the valve seat 128 to thus shut off flow through the nipple 12, as shown in FIGURE 7. The amount of gas which will escape before the valve 122 is closed will be extremely small and, in fact, unappreciable, so that no danger whatever will exist as a result of escape of such a minute quantity of gas.

After the excessive-flow safety valve 122 has been closed as aforedescribed, the pin 58 is retracted to permit removal of the valve 28 and the service line 20 is connected to the outer end of the nipple 12, as shown in FIGURE 8. The service line is then run to the dwelling (not shown) or other consumption point. Thereafter, in order to establish service, i.e., to open the valve 122 in order to allow gas to flow from the main 10 through the nipple 12 and into the service line 20, the seating pressure differential across the ball valve 130 is reduced until the valve 122 opens. This may be accomplished in two ways.

First of all, the ball valve 130 may not be engaged fluid-tight with its seat 128, so that if the service line 20 and the house piping are tightly closed, the seepage of gas past the ball valve will gradually build up pressure within the service line to a point where the pressure differential across the ball valve is insufficient to maintain the same seated against the attractive force of the magnet 132 and the weight of the ball valve. Whereupon, the ball 130 will drop and be pulled away from its seat 128 by the attractive force of the magnet 132, thus opening the valve 122 and establishing service.

In the event that the ball valve 130 seats tightly and no leakage of gas takes place between the interengaged threads of the nipple 12 and the body member 124, fluid under pressure, such as compressed air from an appropriate source 156, may be introduced through an appropriate connection 158 into the service line 20, as shown in FIGURE 8, until the pressure therein is increased to a point where the pressure differential accross the ball valve 130 is insufficient to maintain the same seated, as above described. Whereupon the valve 122 will open and establish service. By operation of either of the above methods of opening the valve 122, the latter will be reset for shutting off flow to the service line 20 in the event of excessive flow through the valve for any reason, usually fracture or a break in the line beyond the valve.

Referring now to FIGURES 9 and 10 of the drawings there is shown another embodiment of the invention which uses a modified type of a service nipple 160 provided with a conventional friction-grip type of coupling 162 for connecting a service line 164 to the nipple. The nipple 160 is interiorly enlarged, outwardly of interior threads 166 at its inner end, to accommodate one end of the service line 164 which is inserted into the outer end of the nipple. Further, the nipple 160 is provided with exterior threads 168 adjacent its outer end and the outer end face of the nipple is interiorly bevelled, or otherwise suitably shaped, to provide a generally frusto-conical annular recess 170 about the line 164. The recess 170 is adapted to receive a packing ring or gasket 172 having an exterior surface generally complementary to the recess and an inner surface that is generally cylindrical and, when the gasket is uncompressed, is of a diameter slightly greater than that of the outer surface of the service line 164. Engageable with the outer end of the packing is the inturned flange of a generally cup-shaped follower 174 the skirt of which will fit over a generally cylindrical outer end portion 176 of the nipple 160 beyond the threads 168. The follower 174, in turn, is adapted to be engaged by the inturned flange of a coupling nut 178 when the latter is screwed onto the exterior threads 168 on the nipple 160.

In this modified form of the invention, the nipple 160 is welded or otherwise suitably secured to a main 180, as shown in FIGURE 9, in the same manner as is the nipple 12 shown in FIGURE 1. Thereafter, a hole is drilled in the main in alignment with the inner end of the nipple, using drilling apparatus (not shown) of the type shown in FIGURES 2 to 5, except the inlet end of the body 30 of the drilling valve is provided with interior threads 169 engageable with the exterior threads 168 on the outer end of the nipple for connecting and sealing the drilling apparatus to the nipple. After the hole 182 has been drilled in the main 180, as shown in FIGURE 10, the drilling apparatus is removed from the drilling valve and replaced by inserting apparatus (not shown) which may be identical to that shown in FIGURE 6. By use of such inserting apparatus an excessive-flow safety valve 184, identical to the valve 122 shown in FIGURES 6 to 8, is inserted into the nipple 160 and screwed into the interior threads 166 therein. Whereupon, both the drilling valve and the inserting apparatus can be unscrewed and removed from the outer end of the nipple 160. The excessive-flow safety valve 184 then will close in exactly the same manner as is shown in FIGURE 7 of the drawings.

Thereafter, the coupling nut 178, follower 174, and gasket 172 are slipped over the end of the service line 164, and the latter is inserted into the nipple 160 as shown in FIGURE 10. The gasket 172 then is advanced into the recess 170 and the coupling nut 178 is advanced, pulling the gasket follower 174 therewith, into engagement with the threads 168 on the nipple 160. The nut 178 is thereupon tightened and in so doing will compress and constrict the gasket 172 into sealing and tight gripping engagement with the outer surface of the service line 164. Thereafter, service can be established either by relying on seepage of gas past the seated ball valve 186 of the excessive flow safety valve 184, or by the introduction of fluid under pressure from an appropriate source 188 and through an appropriate connection 190 into the service line, in order to equalize the pressure differential across the seated ball valve 186 and allow the safety valve 184 to open in exactly the same manner as is described above with reference to FIGURE 8.

It will be seen that in the service connection shown in FIGURE 10, the service line 164 is connected to the service nipple 160 only by a friction grip, so that if the line 164 is put under tension, as by being accidentally encountered by a powered excavating machine, the line simply will pull out of the nipple without damage to the line, the nipple, the gasket 172, the follower 174, or the coupling nut 178. In such event, the immediate excessive flow of gas through the valve 184 will cause the ball 186 to be forced away from the permanent magnet 192 and into engagement with the valve seat 194, thus immediately shutting off further escape of gas from the main 180 through the nipple 160 to atmosphere. Thereupon, the coupling nut 178 can be unscrewed from the nipple 160 and, along with the follower 174 and gasket 172, slipped over the withdrawn end of the service line 164, and the latter then inserted back into the nipple. The gasket 172, follower 174 and coupling nut 178 are then replaced in securing position as shown in FIGURE 10, and the nut retightened to re-establish the sealed friction-grip connection of the service line 164 to the nipple 160. Thereafter, service is restored by reopening the valve 184 in either of the ways described heretofore.

Referring now to FIGURE 11, there is shown a modified form of the invention wherein by using a nipple 196, of the type shown in FIGURES 9 and 10, as an auxiliary or supplemental fitting for a conventional service T 198, many of the advantages of this invention can be had for a service connection. The nipple 196 can be used to modify existing service connections made with a conventional service T 198 or to make a new service connection with a conventional service T.

In this arrangement, a conventional service T 198, which has a through bore 200 and a lateral bore 202 communicating therewith, has one end of the T welded, or otherwise suitably secured, to a main 204 so that the T extends radially therefrom in a conventional manner. If the T 198 is being used to make a new service connection, either before or after the T 198 is secured to the main, a nipple 196, identical to the nipple 160 shown in FIGURES 9 and 10, has the inner or inlet end thereof welded, as at 206, to the outer end of the tubular portion 208 of the T which surrounds the lateral bore 202. After the nipple 196 has been so connected to the T 198, an excessive flow safety valve 210, identical to the valve 122 shown in FIGURES 6, 7 and 8, is screwed into the interior threads 212 at the inner end of the nipple by use of an appropriate tool (not shown), similar to the tool 144 used with the inserting apparatus shown in FIGURE 6. After the valve 210 has been secured in the nipple 196, the end of the service line 214 is connected to the outer end of the nipple, by use of a gasket 214, follower 216, and coupling nut 218, in exactly the same manner as shown in FIGURE 10.

Thereafter, by use of known drilling equipment which includes a valve (not shown) which performs the same function as the valve 28 shown in FIGURES 2 and 3, and by use of drilling apparatus (not shown) which performs the same function as the drilling apparatus 70 shown in FIGURES 2 and 3 and which is connected to the outer end of the T 198 so that the drilling apparatus can operate downwardly through the through bore 200, a hole 220 is drilled in the main 204 in alignment with the inner end of the T through bore. The drilling apparatus is then withdrawn, the drilling valve closed, and the drilling apparatus replaced by inserting apparatus (not shown) of the type shown in FIGURE 6. This latter apparatus is then employed to insert a closure plug 222 into threaded engagement with the interior threads 224 at the outer end of the T through bore 200, in a known manner. The drilling valve, together with the inserting apparatus, is then removed from the outer end of the T 198 and then replaced with a closure cap 226.

When the hole 220 is drilled in the main 204, as aforedescribed, service will be established by flow of gas from the main through the T 198, the fitting 196, and into the service line 214. Thereafter, all of the advantages of the service connection shown in FIGURE 10 will be had, i.e., in the event that the service line 214 is accidentally subjected to undue tension, it will pull free of its connection with the fitting 196 without damaging either the end of the service line or the connection parts of the fitting, and at the same time the excessive flow safety valve 210 will close to prevent escape of gas from the main through the T and fitting to the atmosphere. Additionally, the service line 214 can readily be reinserted into the fitting 196, the connection re-tightened, and service re-established as aforedescribed with reference to FIGURE 10.

In the event that the nipple or fitting 196 is to be used to modify an existing service connection made with the conventional service T 198, the service line 214 will have been welded directly to the tubular portion 208 of the T. The first step in such an operation is to remove the closure cap 226 from the T 198, and then by use of appropriate conventional equipment, which involves a drilling valve, the closure plug 222 is removed from the outer end of the T 198 without allowing escape of fluid from the main 204 to the atmosphere via the outer open end of the T throughbore 200. Next, using conventional line-stopping equipment which is inserted through the drilling valve into the outer open end of the T throughbore 200, flow is shut off from the main into the T lateral bore 202. With the flow thus shut off the service line 214 can be disconnected, as by cutting or sawing with an appropriate tool (not shown), from the outer end of the tubular portion 208 of the T 198. The nipple or fitting 196 then is welded to the outer end of the tubular portion 208 of the T 198 and the end of the service line 214 connected into the outer end of the fitting 196 in exactly the same manner as described above. After line 214 has been so connected, the line-stopping equipment can be removed to re-establish flow of fluid from main 204 through the T 198 and fitting 196 into the service line 214. The closure plug 222 and closure cap 226 are then replaced in the same manner as aforedescribed.

Referring now to FIGURE 12 there is shown a modified form of the invention which corresponds to some extent, to FIGURE 11, but wherein the conventional service T 198 and fitting 196 are replaced by a unitary service T 226 having the tubular portion 228 surrounding its lateral bore 230 modified to accommodate the parts of a friction grip coupling 232, and also having the lateral bore provided with interior threads 234 at its inner end for the reception of an excessive flow safety valve 236 of the type heretofore described. Use of this modified form of the invention is substantially identical to that form of the invention shown in FIGURE 11, i.e., the T 226 is welded to the main 238, the excessive flow safety valve 236 is installed in the T, the service line 240 is connected to the T, a hole 242 is drilled in the main 238, and the outer end of the T 226 provided with a closure plug 244 and cap 246 in precisely the same manner as in that embodiment of the invention shown in FIGURE 11.

It thus will be seen that the objects of this invention have been fully and effectively accomplished. It will be realized, however, that various changes may be made to the embodiments specifically shown and described to illustrate the principles of this invention without departure from such principles. Additionally, although the invention has been described with special reference to methods and apparatus for connecting a service line to a gas main, it will be realized that the invention is equally applicable for connecting any line to a hollow body containing fluid under pressure. Consequently, the terminology employed in the specification and claims is not to be construed as limiting, but only as illustrative. Accordingly, this invention includes all embodiments encompassed and within the spirit and scope of the following claims, having due regard for all equivalents.

What is claimed is:

1. The method of connecting a service line to a main without escape of fluid to the atmosphere, the steps comprising: securing fluid-tight to the wall of the main one end of a nipple; drilling a hole in the wall of the main at the inner end of the nipple without escape of fluid to the atmosphere; inserting and fastening within the nipple from the outer end thereof and without escape of fluid to the atmosphere an excessive-flow-safety-valve means resettable by reduction of the pressure differential thereacross when closed; exposing the outer end of the nipple to atmosphere to thereby effect closing of the valve means; connecting a service line fluid-tight to the outer end of the nipple; and reducing the pressure differential across the closed valve means sufficiently to open the same and establish service.

2. The method defined in claim 1 in which the valve means leaks slightly when closed and wherein the pressure-differential reduction is accomplished by closing the service line fluid-tight so that leakage through the valve means will build up pressure in the line.

3. The method defined in claim 1 wherein the pressure-differential reduction is accomplished by introducing fluid under pressure from an outside source into the line.

4. The method defined in claim 1 wherein the service line is connected to the nipple by friction-grip coupling means.

5. Apparatus for connecting a service line to a main without escape of fluid to the atmosphere, comprising: a nipple adapted to have one end thereof secured fluid-tight to the wall of a main and the other end thereof secured fluid-tight to an end of a service line; an excessive-flow-safety-valve means resettable by reduction of the pressure differential thereacross when closed and adapted to be inserted into said nipple from said other end thereof, said valve means including a sleeve-like body; interengageable thread means in said nipple and on said body for fastening said valve means in said body; and means on the outer end of said body detachably engageable by a tool for inserting said valve means into said nipple and engaging said thread means to fasten said valve means in said nipple.

6. The structure defined in claim 5 in which the other end of the nipple is provided with exterior threads alternatively engageable by a coupling nut or by means for connecting to said nipple other end a closed pressure chamber through which tools may be manipulated without escape of fluid to the atmosphere, said nipple other end also being provided with an annular recess for the reception of packing compressible by a coupling nut engaged with said threads into sealing and gripping engagement about the end of a service line inserted into said nipple other end.

7. The structure defined in claim 5 in which the tool engageable means includes interior threads and a transverse kerf in the outer end of the body.

8. The structure defined in claim 5 in which the valve means includes a valve seat, a movable valve member seatable on said seat, and permanent magnet means for normally maintaining said member unseated.

9. The structure defined in claim 5 in which the nipple has an exterior circumferential groove for engagement by means for connecting to the other end of the nipple a closed pressure chamber through which tools may be manipulated without escape of fluid to the atmosphere.

10. The structure defined in claim 9 in which the nipple is provided adjacent the other end thereof with a smooth-walled exterior cylindrical section and also provided between said section and the one end of the nipple with an exteriorly enlarged non-circular section.

11. Apparatus for connecting a service line to a main comprising: a nipple adapted to have one end thereof secured fluid-tight to a main, said nipple being provided adjacent the other end thereof with a smooth-walled cylindrical exterior section, and also being provided between said section and said one end of the nipple with a non-circular exteriorly enlarged section; valve means through which tools can be extended for operation within said nipple, said valve means having a body provided with an inlet adapted to snugly and slidably engage over said other end of said nipple, said inlet being complementary to esaid sections; whereby engagement of said inlet with said non-circular section prevents rotation of said valve means relative to said nipple about the axis of the latter; gasket means carried by said body within said inlet for sealing engagement with the exterior surface of said cylindrical section of said nipple; and means for retaining said valve means in engagement with said nipple.

12. The structure defined in claim 11 in which the retaining means includes an exterior circumferential groove in the nipple and a pin movably carried by the body and releasably engageable with said groove.

13. The structure defined in claim 12 including interengageable shoulders on the nipple and within the inlet for aligning the pin and the groove.

14. Apparatus for connecting a service line to a main comprising: a nipple adapted to have one end thereof secured fluid-tight to a main and having exterior threads adjacent, and an annular packing recess in, the other end thereof; valve means through which tools can be extended for operation within said nipple, said valve means having a body provided with an inlet having interior threads engageable with said nipple threads; an excessive-flow safety valve means resettable by reduction of the pressure differential thereacross when closed and adapted to be inserted into said nipple from said other end thereof; and interengageable means on said nipple and safety valve means for fastening the latter in the former.

15. An underground service connection comprising: a buried main containing fluid under pressure; a service fitting connected to said main at an underground location, said fitting having an inlet in communication with said main and an outlet terminating in a tubular portion provided with an annular packing recess in the end thereof and with threads; packing in said recess; an underground service line having one end thereof inserted into said fitting tubular portion through said packing; a nut engaged with said threads on said fitting tubular portion and compressing said packing into sealing and gripping engagement with said service line one end; excessive-flow safety valve means in said fitting for controlling flow therefrom into said service line, said valve means including a sleeve-like body insertable into said fitting through said outlet, when said service line is disconnected from said fitting; and interengageable means in said fitting and on said body for fastening the latter in the former.

16. The structure defined in claim 15 in which the valve means is resettable by reduction of the pressure differential thereacross when closed.

17. The structure defined in claim 15 in which the fitting is a nipple.

18. The structure defined in claim 15 in which the fitting is a T having a through bore and a lateral bore communicating with said through bore and constituting the outlet, one end of said through bore constituting the inlet, and including closure means detachably secured to said T and closing the other end of said bore.

19. A service T for connecting a service line to a main comprising: a body having a through bore, a lateral bore communicating therewith, and a tubular portion surrounding the outer end of said lateral bore, said tubular portion having an annular packing recess in its outer end and threads for engagement by a nut to compress packing in said recess into sealing and gripping engagement with the end of a service line inserted into said tubular portion, said body being adapted to be secured fluid-tight to a main with one end of said through bore in communication therewith; closure means detachably securable to said body for closing the other end of said bore; excessive-flow safety valve means in said body and controlling flow therefrom through said lateral bore, said valve means including a sleeve-like body insertable into said fitting through said outlet, when said service line is disconnected from said fitting; and interengageable means in said fitting and on said body for fastening the latter in the former.

20. The structure defined in claim 19 in which the valve means is resettable by reduction of the pressure differential thereacross when closed.

21. The structure defined in claim 19 including packing in the recess and a nut engaged with the threads.

References Cited by the Examiner
UNITED STATES PATENTS

| | | | |
|---|---|---|---|
| 2,569,316 | 9/1951 | Jerman | 251—65 X |
| 2,784,933 | 3/1957 | Newell et al. | 251—330 X |

ISADOR WEIL, *Primary Examiner.*